R. E. HELLMUND.
SYSTEM OF CONTROL.
APPLICATION FILED JAN. 16, 1917.
1,327,823.
Patented Jan. 13, 1920.
2 SHEETS—SHEET 1.
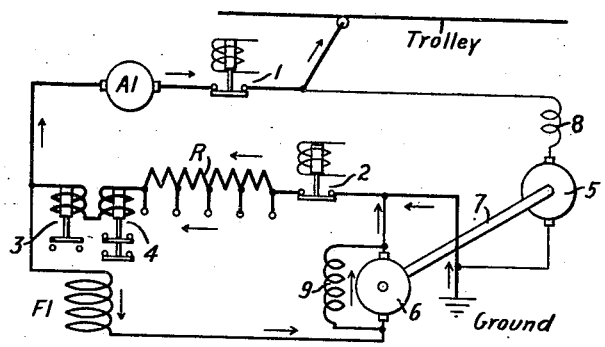
Fig. 1.
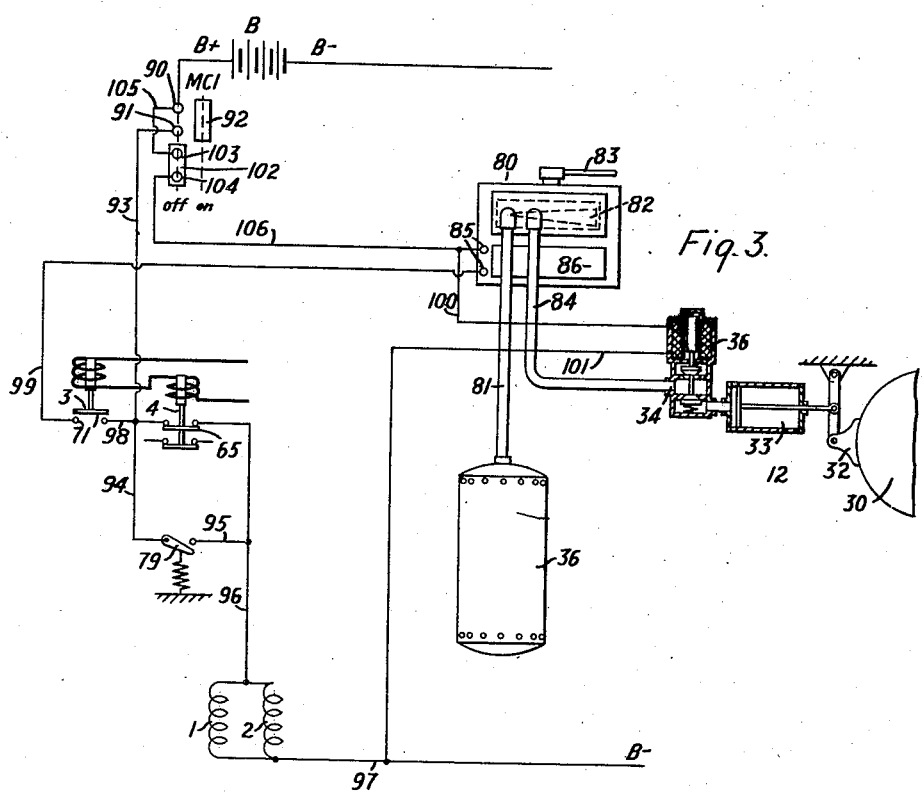
WITNESSES:
Fred. A. Lind.
W. R. Coley
INVENTOR
Rudolf E. Hellmund
BY
Wesley G. Carr
ATTORNEY

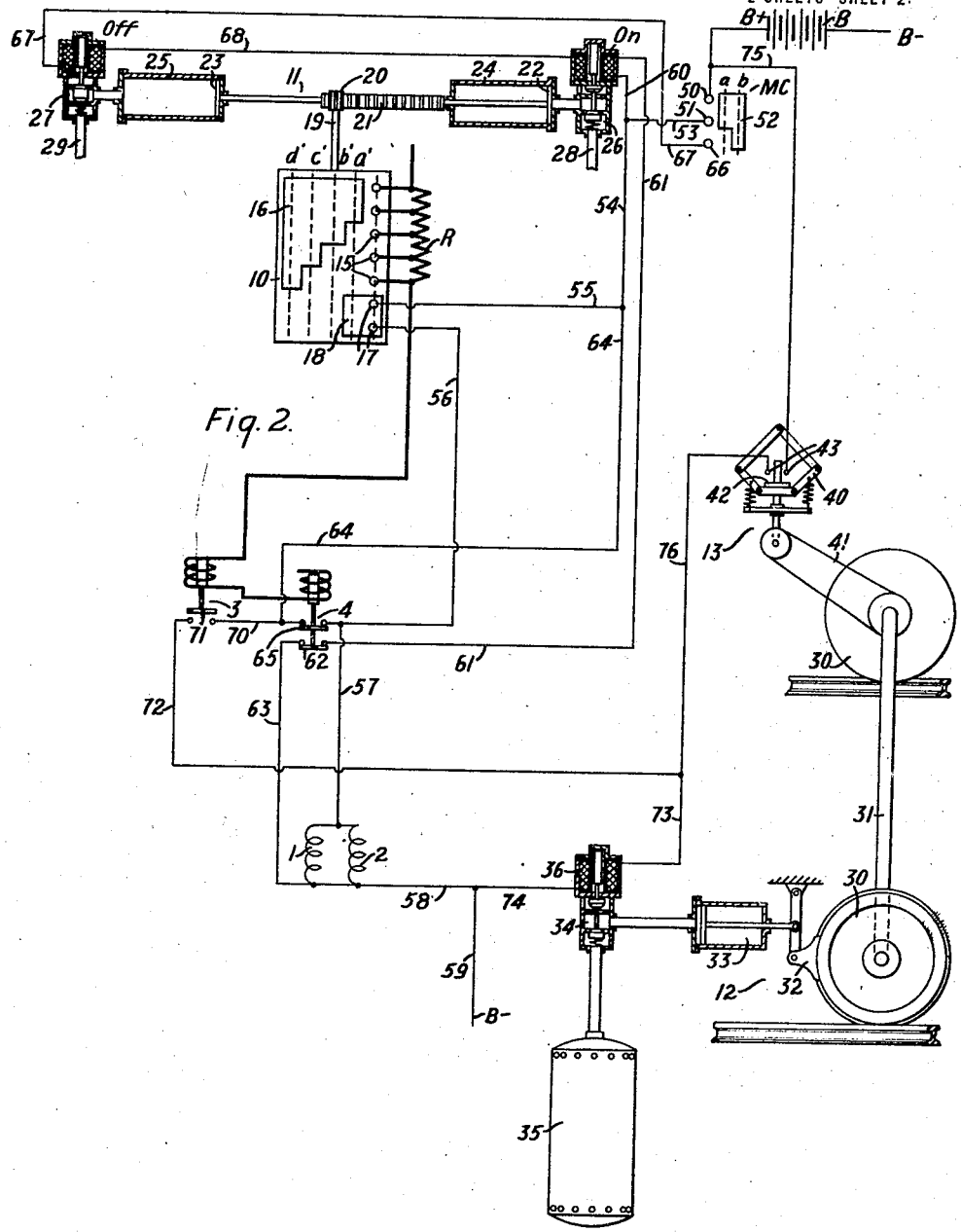

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,327,823.   Specification of Letters Patent.   Patented Jan. 13, 1920.

Application filed January 16, 1917. Serial No. 142,645.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Systems of Control, of which the following is a specification.

My invention relates to systems of control and especially to a combination of electrical and mechanical braking systems.

The object of my invention is to provide a combination system of the above-indicated character, wherein regenerative or other electric braking shall be utilized until relatively low-speed conditions are attained and subsequently, after a predetermined time interval, to allow a fully operative effect of the mechanical braking system, the electric braking is automatically discontinued.

It has previously been proposed to automatically set air-brakes or other mechanical braking means when the current generated by a momentum-driven dynamo-electric machine has decreased to a relatively low value. However, since there is necessarily a certain time constant required for rendering the air-brakes fully operative, the use of the system just recited will cause a short discontinuation of all braking effort, which, of course, is undesirable, particularly if the train or vehicle to be retarded is traveling down a grade.

According to my present invention, therefore, I provide means which may take the form of two torque or current relays of different settings, one of which acts under relatively low regenerated-current conditions to render the air-braking or other mechanical braking system effective without disturbing the electrical connections in any manner, while the second relay, after a predetermined time interval, will act to interrupt the electric braking connections so that the train may be brought to a stand-still wholly by the influence of the air-braking system.

In accordance with another modification of my invention, I so interlock the electrical and mechanical braking systems that the mechanical system may be manually operated after being automatically rendered effective near the end of the regenerative period, and also for effecting normal stops when electric braking is not utilized, while the regenerative braking action and the previously-mentioned automatic setting of the air-brakes is freely permitted, as hereinafter more fully set forth.

My invention may best be understood by reference to the accompanying drawings, wherein Figure 1 is a diagrammatic view of the main circuits of a system of control embodying my invention; Fig. 2 is a complete diagrammatic view of the auxiliary circuits for governing the main-circuit connections that are shown in Fig. 1 and also showing an additional braking system, in this case, the familiar air-brake; and Fig. 3 is a partial diagrammatic view of a modified auxiliary control system corresponding to Fig. 2.

Referring to Fig. 1 of the drawing, the system shown comprises suitable supply-circuit conductors, respectively marked "Trolley" and "Ground"; a main dynamo-electric machine having an armature A1 and a field winding F1 of the familiar series type; a variable resistor R that is connected in the circuits of both the main armature winding and the main field winding; an auxiliary motor-generator set having armatures 5 and 6 that are respectively driven from the supply circuit and are employed to excite the main field winding F1 during regeneration a plurality of main-circuit switches 1 and 2; and a plurality of relays 3 and 4 having different current settings for purposes to be described.

Inasmuch as the accelerating connections for the main machine and the specific means for inaugurating regenerative operation are immaterial to my present invention, I have deemed it necessary to illustrate only a sufficient number of switches and relay devices for performing the desired functions, whereby the principles of my present invention are clearly set forth. The necessary switching devices to effect the various circuit connections, that are now shown as permanent, may be readily supplied by those skilled in the art, and no further illustration or explanation thereof is believed to be requisite.

The motor-generator set or dynamotor is shown as comprising a plurality of auxiliary armature windings 5 and 6 that may be mechanically connected in any suitable manner, as by a shaft 7, a series-related field winding 8 for the motor or driving armature 5 and a shunt-connected winding 9 for the exciting or generator armature 6. It will be appreciated that any other suitable type of auxiliary motor-generator set or other source of energy for performing the desired function of exciting the main field winding F1 during regenerative operation may be employed.

Assuming that regenerative operation has been begun in any well-known manner, whereby the switches 1 and 2 occupy the illustrated closed positions, the main or regenerative circuit is established from the "ground" through switch 2, variable resistor R, the actuating coils of the relay devices 4 and 3, the main armature A1 and the switch 1 to the other supply-circuit conductor, Trolley.

The main field-winding or exciting circuit is completed from one terminal of the auxiliary generator armature 6 through the switch 2, the variable resistor R, the actuating coils of the relay devices 4 and 3, the main field winding F1 and thence to the other terminal of the exciting armature 6.

The main field winding F1 is thus excited solely by the auxiliary generator armature 6, while the resistor R carries both the main-armature and the main-field-winding currents in the same direction, as indicated by the arrows. The advantages of the illustrated regenerative system are fully set forth in my co-pending application, Serial No. 44,443, filed August 9, 1915, patented Apr. 1, 1919, No. 1,298,706; but, inasmuch as the particular type of regenerative or dynamic braking system is immaterial to my present invention, no further description or explanation thereof is thought to be necessary.

Referring to the auxiliary governing system that is shown in Fig. 2, the system comprises, in addition to the actuating coils of the main-circuit switches 1 and 2 and the auxiliary contact members of the relay devices 3 and 4, a drum controller 10 for varying the active circuit value of the resistor R; an actuating mechanism 11 for the controller 10; a mechanical braking system, here shown as the familiar air-brake 12; a centrifugally-operated switch 13 that is associated with the air-brake system in a manner to be described; and an auxiliary source of energy, such as a battery B, for energizing the various auxiliary circuits in accordance with the position of a master controller MC that is adapted to occupy operative positions $a$ and $b$.

The controller 10 is provided with a plurality of stationary contact members or fingers 15 that are connected to suitable points of the resistor R and are adapted to be successively engaged by a contact segment 16 of suitable configuration, whereby the resistor may be gradually short-circuited as the controller 10 successively assumes its operative positions $a'$ to $d'$, inclusive, for example. A plurality of auxiliary control fingers 17, which engage a contact segment 18 in the off position and first operative position $a'$ of the controller 10, are employed in connection with the main-circuit switches 1 and 2, as hereinafter more completely traced.

The actuating mechanism 11 is of a familiar electrically-controlled, pneumatically-operated type and comprises the operating shaft 19 of the controller 10, to the upper end of which a pinion 20 is secured to suitably mesh with a horizontally-movable rack member 21. Piston members 22 and 23 are attached to the respective ends of the rack member 21 to travel within suitable operating cylinders 24 and 25, to which fluid pressure from any suitable source (not shown) may be admitted through the agency of dissimilar valves 26 and 27 and pipes or passages 28 and 29, respectively, under predetermined conditions to be described. The valves 26 and 27 are respectively provided with actuating coils "On" and "Off".

The operation of the actuating mechanism 11, without regard to the electrical connections affected thereby, may be set forth as follows: Since the valve 27 is normally open to admit fluid pressure to the cylinder 25, while the other valve 26 is normally closed to prevent the access of fluid pressure to the cylinder 24 and to connect that cylinder to the atmosphere, it follows that the pistons 23 and 22, and hence, the controller 10, are normally biased to the illustrated positions.

By concurrently energizing the actuating coils "On" and "Off", the initial unbalanced fluid-pressure conditions are reversed; that is to say, fluid pressure is admitted to the cylinder 24 and is exhausted from the cylinder 25, to thereby cause a movement of the pistons toward the left, in the illustrated case, whereby the controller 10 is moved to its successive operative positions.

To arrest the movement of the controller 10 at any time, it is merely necessary to deënergize the "off" actuating coil, whereby balanced fluid-pressure conditions obtain in both operating cylinders and a positive and reliable stoppage of the mechanism is secured. To return the actuating mechanism to the illustrated position, the coils "On" and "Off" are both deënergized, whereby the fluid-pressure conditions revert to the original state, and the desired movement is produced.

The air-brake system 12 is diagrammatically illustrated as comprising a plurality of vehicle wheels 30 which are mounted upon a common axle 31; a brake-shoe 32 for engaging one or more of the wheels 30; a brake-cylinder 33 for applying a suitable leverage to the brake-shoe 32; and a valve 34 for admitting fluid pressure from a tank or reservoir 35 to the brake cylinder 33 when an actuating coil 36 is energized.

The centrifugally-operated device 13 may be of any familiar character and comprises a linkage mechanism 40 that is driven in accordance with the speed of the wheel axle 31 through the medium of a belt 41, for example, and carries a movable contact member 42 which is elevated to bridge a pair of stationary contact members 43 and thus complete the circuit of the air-brake valve-actuating coil 36 under relatively high-speed conditions of the vehicle.

Assuming that the various circuit connections are as illustrated and that it is desired to effect regenerative operation of the momentum-driven main dynamo-electric machine under suitable conditions, the master controller MC may be actuated to its initial operative position $a$, whereupon a circuit is initially established from the positive battery conductor B+ through control fingers 50 and 51, which are bridged by contact segment 52 of the master controller, conductors 53, 54 and 55, control fingers 17, which are bridged by contact segment 18 of the main controller 10 in its normal or off position, conductors 56 and 57, the parallel-related actuating coils of the main-circuit switches 1 and 2 and conductors 58 and 59 to the negative battery conductor B—. The main-armature and main-field-winding circuits are thus completed, as illustrated in Fig. 1, and regenerative operation begins which will cause the relay devices 3 and 4 to be raised to the illustrated positions wherein the relay device 3 is inoperative, while the other relay device 4 completes two auxiliary circuits, as about to be traced.

One of the circuits just referred to is established from the conductor 54 through conductor 64, coöperating contact members 65 of the relay device 4 in its upper or closed position and thence to conductor 57 and the actuating coils of the switches 1 and 2, the energization of which is thereby rendered independent of the position of the main controller 10, the contact members 17 and 18 of which become disengaged as soon as the controller passes beyond its initial operative position $a'$. Under such conditions, the closure of the main-circuit switches is entirely dependent upon the value of regenerated current traversing the actuating coil of the relay device 4.

Another auxiliary circuit is completed at this time from the positively energized conductor 53 through conductor 60, the actuating coil "On" of the mechanism 11, conductor 61, contact members 62 of the relay device 4, in its closed position, and conductors 63 and 58 to the negative conductor 59.

Upon the energization of the actuating coil "On," fluid pressure is admitted to the cylinder 24, but no movement of the drum controller 10 ensues, since fluid-pressure conditions are balanced in the two operating cylinders. Upon actuation of the master controller to its position $b$, however, a new circuit is established from the contact segment 52 thereof through control finger 66, conductor 67, the actuating coil "Off" and conductor 68 to the conductor 61, whence circuit is completed as already traced.

Since both actuating coils of the mechanism 11 are concurrently energized, the previously-described movement of the controller 10 to gradually short-circuit the resistor R is effected. It will be understood that the rate of progress of such short-circuit of the resistor may be varied, either manually by suitable manipulation of the master controller, or through the agency of the familiar limit switch. In either case, by deënergizing the "off" actuating coil, the controller 10 may be held in any desired position, while forward or backward movements thereof may be effected by concurrently energizing or deënergizing the actuating coils, as previously stated.

Assuming that the entire resistor R has been short-circuited and that a relatively low machine and vehicle speed, with a correspondingly low value of regenerated current, has been attained, the relay device 3 will drop to its lower or operative position, in accordance with its current setting, whereas the other relay device 4 will remain in its illustrated position by reason of the fact that it is adapted to drop at a predetermined lower value of current.

As soon as the relay device 3 assumes its lower position, a circuit is completed from the positively-energized conductor 64 through conductor 70, coöperating contact members 71 of the relay device 3, conductors 72 and 73, the actuating coil 36 of the air-brake valve 34 and conductor 74 to the negative conductor 59. The valve 34 is thus opened to admit fluid pressure to the brake-cylinder 33, whereby the air-brakes are applied in the usual manner, thus tending to bring the vehicle to a stand-still by the use of a suitable mechanical braking effort when the regenerative braking effect has become weak.

As soon as the mechanical braking effort has assumed normal proportions, or, more specifically stated, as soon as the regenerated current has decreased to a very low value, the relay device 4 drops to its lower position, whereby the circuits of the actuating coils of the main-circuit switches 1 and 2, as well as the circuits of the "on" and "off" coils, are interrupted. In this way, the main regenerative circuits are opened, while the main controller 10 is automatically returned to its illustrated off position.

It will be understood that, by suitable design and arrangement of the relay devices 3 and 4, any desired time interval may be caused to elapse between the initial setting of the air-brake system and the subsequent interruption of the regenerative circuits. Other means for accomplishing a similar result are the application of a dash-pot device, or the like, to the relay device 3 to cause the opening of the auxiliary circuits now governed by the relay device 4 after a predetermined time interval, or an interlock on the piston-rod of the air-brake cylinder which interrupts the desired auxiliary circuit connections after the piston has moved to a certain position. Inasmuch as the arrangements just recited are simple and readily comprehended, it has not been deemed necessary to illustrate these or other modifications of this portion of my invention.

In some cases, it will be advisable to automatically set the air-brakes or other mechanical braking means whenever an unduly high vehicle speed is reached, regardless of the condition of the electric braking system at the time. Such a result may be readily effected through the use of the centrifugal device 13, which acts to bridge the stationary contact members 43 under such high-speed conditions, whereupon an auxiliary circuit is completed from the positive battery conductor B+ through conductor 75, coöperating stationary and movable contact members 43 and 42, respectively, of the centrifugal device 13 and conductors 76 and 73 to the actuating coil 36 of the air-brake valve 34, whereby the air-brakes are applied in the above-described manner.

Reference may now be had to Fig. 3, which discloses in addition to an air-brake system, corresponding to the previously described system 12, an engineer's valve 80 for governing the air-brake system under certain conditions; a master controller MC1; a starting switch 79; and the actuating coils of the switches 1 and 2, the auxiliary contact members of the relay devices 3 and 4, and the battery B.

The air tank or reservoir 36 is connected, through a pipe 81, to the engineer's valve 80, which is here shown developed into a single plane for purposes of clearness and is provided with a wedge-shaped slot 82, whereby, upon movement of the valve by its handle 83 into its various operating positions, proper application of air-pressure is effected through a pipe 84 to the valve 34 and the air-brake cylinder 33 when the valve is open, as will be understood.

The engineer's valve 80 is also supplied with a plurality of auxiliary-circuit control fingers 85 which are bridged by a contact segment 86 whenever the valve occupies any of its operative positions; that is, any of the positions other than that illustrated.

Assuming that it is desired to effect regenerative operation of the system, the master controller MC1 may be moved to its operative position marked "On," whereupon a circuit is established from the positive battery conductor B+ through control fingers 90 and 91 which are bridged by contact segment 92 of the master controller, conductors 93 and 94, the starting switch 79, which is normally biased to the illustrated open position and is temporarily closed by the train-operator, conductors 95 and 96, the parallel-related actuating coils of the switches 1 and 2 and conductor 97 to the negative battery conductor B—.

The engineer's valve 80 is moved to any desired operative position at any time subsequent to the actuation of the master controller. By this initial adjustment the value of the air-braking effect that is automatically applied at the end of the regenerative period, as hereinafter more fully set forth, is selectively determined by the train-operator.

Upon the closure of the switches 1 and 2 and the consequent traversal of the regenerated current through the actuating coils of the relay devices 3 and 4, the relay devices are actuated to their illustrated upper positions, whereby the starting switch 79 is short-circuited by the auxiliary contact members 65 of the relay device 4. Hence, the starting switch 79 may be released, and the energization of the actuating coils of the switches 1 and 2 is thereafter dependent upon the position of the relay device 4. It will be understood that any other suitable means for effecting the initial closure of the switches 1 and 2 may be utilized, the present simplified arrangement being merely typical.

Assuming that the relatively low value of regenerated current which corresponds to the setting of the relay device 3 has been attained near the end of the regenerative period, the relay device 3 will drop to its lower position, whereupon a circuit is completed from the positively-energized conductor 98 through coöperating contact members 71 of the relay device, conductor 99, control fingers 85, which are bridged by contact segment 86 in whatever operative position the engineer's valve 80 initially occupies, conductor 100, the actuating coil 36 of the air-brake valve 34 and conductor 101 to the negative battery conductor B—. Thus, an application of the air-brakes, the force of which depends upon the initial manipulation of the engineer's valve 80, is automatically made as soon as the relay device 3 drops to its lower position, and the engineer's valve 80 may then be actuated in any suitable manner to bring the vehicle to a stand-still. In the meanwhile, the other relay device 4 drops to its lower position as soon as the corresponding value of the regenerated current is attained, to thereby interrupt the regenerative circuits, as previously described.

In order to permit of the customary use of the engineer's valve 80 whenever electric braking is not employed, I provide an auxiliary contact member 102 which bridges stationary contact members 103 and 104 in the off position of the master controller.

Thus, to make the normal stop through the agency of the air-brakes alone, the master controller MC1 is first returned to its off position and the engineer's valve 80 is properly manipulated. The control of the air-brake system by the engineer's valve at this time is permitted, since the air-brake valve 34 is opened by the completion of a circuit from the positively-energized control finger 90 of the master controller through conductor 105, control fingers 103 and 104, which are bridged by the contact segment 102, conductor 106 and conductor 100 to the actuating coil 36. Thus, the normal effectiveness of the air-braking system is dependent upon the cessation of the electric braking effect, that is, upon the occupation of the off position by the master controller MC1.

In the system just described, the free manipulation of the engineer's valve is permitted to effect normal stops through the agency of the mechanical braking system alone, while a mechanical braking application of any desired strength, dependent upon the initial adjustment of the engineer's valve, is automatically effected as soon as the regenerated current drops to a relatively low value, which causes the relay device 3 to operate.

I do not wish to be restricted to the specific structural details or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of vehicle control, the combination with an electrically braking dynamo-electric machine, of other braking means, control means for adjusting the initial braking effect of said braking means during vehicle operation, means for rendering said braking means operative under predetermined conditions, and means for subsequently causing the cessation of the electrical braking action.

2. In a system of vehicle control, the combination with an electrically braking dynamo-electric machine, of additional braking means, control means for adjusting the initial braking effect of the additional braking means during vehicle operation, and means for rendering said additional braking means operative and for causing the cessation of the electrical braking action in that order.

3. In a system of vehicle control, the combination with an electrically braking dynamo-electric machine, of additional braking means, means for rendering said additional braking means operative under predetermined conditions, control means for adjusting the braking effect of said additional braking means during vehicle operation, and means acting materially later to cause the cessation of the electrical braking action.

4. In a system of control, the combination with an electrically braking dynamo-electric machine, of a mechanical braking system, means for rendering said braking system operative under predetermined relatively weak electrical braking conditions, and means for subsequently causing the cessation of the electrical braking action.

5. In a system of control, the combination with an electrically braking dynamo-electric machine, of a mechanical braking system, a relay device for effecting the operative action of said braking system under relatively weak electrical braking conditions, and a second relay device for automatically effecting the interruption of the electrical braking circuits under still weaker conditions.

6. In a system of control, the combination with an electrically braking dynamo-electric machine, of a mechanical braking system, a relay device energized by the braking current for effecting the operative action of said braking system under relatively low braking-current conditions, and another similarly energized relay device for effecting the discontinuance of the electrical braking under still lower braking-current conditions.

7. In a system of vehicle control, the combination with an electrically braking dynamo-electric machine, of a mechanical braking system, manually-operated means for controlling said mechanical braking system during vehicle operation to determine the initial effect thereof, and means for rendering said braking system operative under predetermined electrical braking conditions, provided said manual means occupies an operative position.

8. In a system of control, the combination with an electrically braking machine, of a pneumatically-operated braking system, a manually-actuated valve member for controlling said braking system, and means dependent upon electrical braking conditions for rendering said braking system operative, provided said valve member occupies a predetermined position.

9. In a system of vehicle control, the combination with an electrically braking machine, of a mechanical braking system, means for rendering said braking system operative under predetermined electrical braking conditions, and means for adjusting the initial mechanical braking effect during vehicle operation.

10. In a system of vehicle control, the combination with an electrically braking machine, of a mechanical braking system, means for rendering said braking system operative when a relatively low machine current obtains, and means for independently adjusting the initial mechanical braking effect during vehicle operation.

11. In a system of control, the combination with an electrically braking machine, of a mechanical braking system, means for rendering said braking system operative under predetermined electrical braking conditions, means for adjusting the initial mechanical braking effect, and means for subsequently causing the cessation of the electrical braking effect.

12. In a system of control, the combination with an electrical braking machine, of a mechanical braking system, means for rendering said braking system operative when a relatively low machine current obtains, means for independently adjusting the initial mechanical braking effect, and means for causing the cessation of the electrical braking effect after a material time interval.

13. In a system of control, the combination with an electrically braking machine, of a pneumatically-operated braking system, a manually-actuated valve member for controlling said braking system, means dependent upon electrical braking conditions for rendering said braking system operative, provided said valve member occupies a predetermined position, and independent means for rendering said braking system operative irrespective of the position of said valve member under relatively high-speed machine conditions.

14. In a system of control, the combination with an electrically braking machine, of a mechanical braking system and manually-operated means for controlling said braking system, of means for automatically rendering said braking system operative under predetermined electrical braking conditions, and means dependent upon the cessation of the electrical braking effect for rendering said manual means normally effective.

15. In a system of control, the combination with an electrically braking machine, of a mechanical braking system, manually-operated means for controlling said braking system, and manually-operated means for governing the electrical braking system, of means for automatically rendering said mechanical braking system operative under relatively weak electrical braking conditions, and means dependent upon the occupation of an inoperative position by said second manually-operated means for rendering said first manually-operated means normally effective.

16. In a system of control, the combination with an electrically braking machine, of a pneumatically-operated braking system, a manually-actuated valve member for controlling said braking system, means dependent upon electrical braking conditions for rendering said braking system operative, provided said valve occupies a predetermined position, and means dependent upon the cessation of the electrical braking effect for rendering said braking system normally operative.

17. In a system of control, the combination with an electrically braking machine, of a pneumatically-operated braking system, a manually-actuated valve member for controlling said braking system, a master controller for governing the electrical braking system, means dependent upon relatively weak electrical braking conditions for rendering said pneumatically-operated braking system operative, provided said valve member occupies an operative position, and means dependent upon the occupation of an inoperative position by said master controller for rendering said manually-operated means normally effective.

In testimony whereof, I have hereunto subscribed my name this 30th day of Dec. 1916.

RUDOLF E. HELLMUND.